March 9, 1954

F. BOUMA ET AL 2,671,698

AUXILIARY TRACTION DEVICE FOR VEHICLES

Filed Sept. 5, 1952

INVENTOR.
Adrian Van der Vliet
BY Frank Bouma

McMorrow, Berman & Davidson
ATTORNEYS.

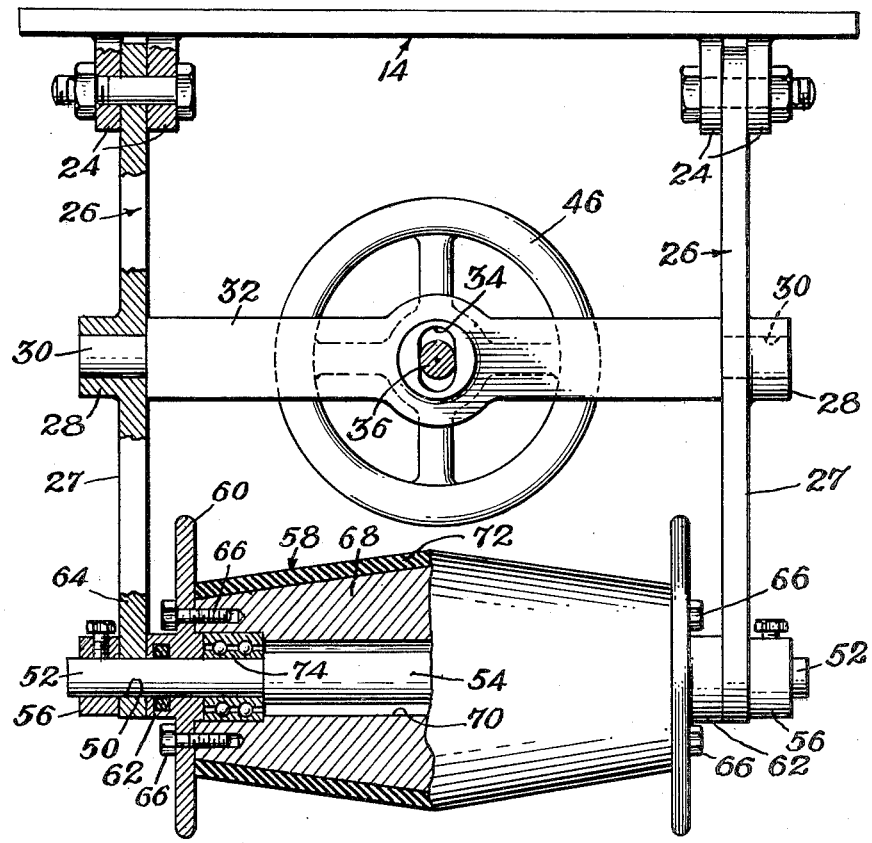
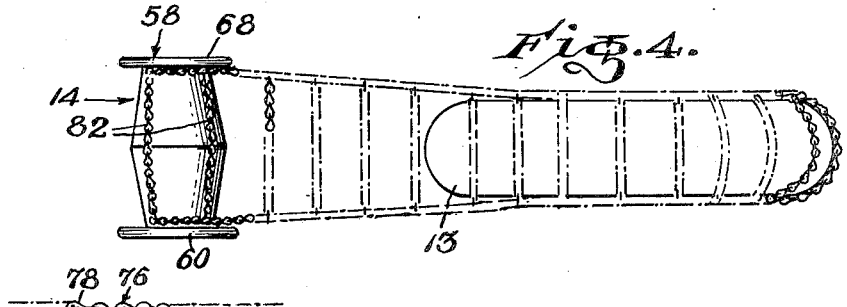
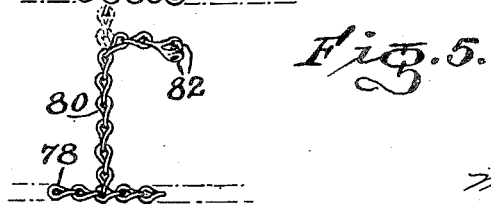

Patented Mar. 9, 1954

2,671,698

UNITED STATES PATENT OFFICE 2,671,698

AUXILIARY TRACTION DEVICE FOR VEHICLES

Frank Bouma and Adrian van der Vliet, Zeeland, Mich.

Application September 5, 1952, Serial No. 308,097

3 Claims. (Cl. 305—3)

1

This invention relates to an auxiliary traction device for vehicles, and more particularly, has reference to a traction device designed to be trained about a selected wheel of a vehicle such as a truck, to facilitate movement of the vehicle over a slippery or muddy surface.

It is well appreciated that in many instances a vehicle, such as a heavy truck, loses traction completely when mired in ice, snow, or mud, and heretofore, it has been proposed to provide auxiliary treads for the drive wheels of a vehicle, which can be attached about the drive wheels for the purpose of increasing traction.

It is the main object of the present invention to provide a generally improved device of this type, which will be easier to apply or remove, than other devices used for the same purpose.

Another important object of the present invention is to provide an auxiliary traction device of the type stated which will include a tensioning means, so designed as to hold an endless chain in close engagement with the tire casing of the wheel.

Another important object is to provide a traction attachment as described which can be applied without jacking up the vehicle wheel.

Another important object is to provide a device as stated which will be so designed as to permit storage of the chain in a compact area when said chain is not in use, the construction of our improved traction device being such as to prevent entanglement of the chain under these conditions.

Still another important object is to provide an auxiliary traction attachment as stated which will be rugged, substantially trouble free in operation, and capable of manufacture at relatively low cost.

Other objects will appear from the following description, the claims appended thereto, and from the annexed drawing, in which like reference characters designate like parts throughout the several views, and wherein:

Figure 3 is a transverse sectional view in which parts remain in elevation;

Figure 4 is a plan view of the idler roller of the device, showing an endless chain in operative association with said roller and with a wheel of the vehicle;

Figure 5 is a fragmentary plan view of the chain showing a detachable connection of a cross chain element to an associated longitudinal chain element.

Figure 2:
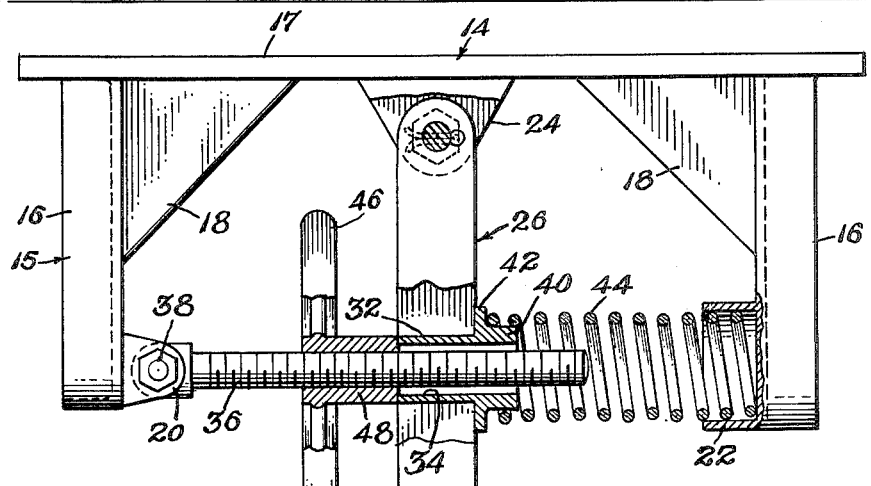
Figure 2 is an enlarged side elevational view of the traction device per se, portions being shown in longitudinal section and other portions being broken away.

Referring to the drawings in detail, the reference numeral 10 has been applied generally to designate the chassis of a vehicle such as a truck, said chassis including longitudinal frame members 12. A rear drive wheel has been designated by the reference numeral 13, said wheel being adapted for association with the traction device constituting the present invention. Said traction device has been designated generally at 14, and includes a hanger bracket designated generally by the reference numeral 15. The hanger bracket 15, as shown in Figure 2, is formed substantially to the shape of an inverted U, said bracket having spaced, vertically depending legs 16 rigidly connected at their upper ends to a bight 17. The bight 17 of the bracket is adapted to be bolted or otherwise fixedly connected to the longitudinal frame member 12 of the truck chassis 10.

To reinforce the fixed connections between the bight and legs 16, we provide gussets 18 secured between the bight and legs.

Secured fixedly to the lower end of one leg 16 are transversely spaced, apertured ears 20, said ears projecting toward the other leg 16. In opposition to the ears 20, we provide a cylindrical socket 22, secured to said other leg 16 and projecting toward the leg having the ears 20.

Fixedly secured to the mid-length portion of the bight 17, and depending from the underside of the bight, are lugs 24, said lugs having transversely aligned openings receiving a pivot pin, whereby there is pivotally connected to and between the lugs the upper end of a swingable hanger arm 26.

As will be noted from Figure 3, two pairs of ears 24 are provided upon the bight 14, said pairs being spaced transversely of the bight. The hanger arm 26, in this connection, is of H shape, having parallel, depending hanger arm members 27 each of which is integrally formed, intermediate its ends, with an outwardly projecting boss 28. The boss 28 of each member 27 has an opening formed therein, the openings of the respective bosses being aligned transversely of the traction device and receiving the reduced ends 30 of a cross member 32 of the hanger arm 26. The cross member 32 is formed, intermediate its opposite ends, with a transverse opening 34 of oblong cross sectional shape, said opening 34 receiving a cylindrical, threaded guide rod 36. The guide rod 36, as shown in Figure 2, has one end thereof pivotally connected to and between the ears 20, a pin 38 extending between said ears 20 to provide for the desired pivotal connection.

Integrally formed upon the intermediate portion of the cross member 32 is a boss 40 having a circumferential collar 42, said opening 34 of the cross member 32 continuing through the boss 40. A spring 44 is held under compression between the hanger arm 26 and that leg 16 having the socket 22, one end of the spring being engaged in the socket 22, and the other end of the spring being circumposed about the boss 40, in engagement with the collar 42.

Threadedly engaged with the rod 36 is an adjusting nut, said nut including a wheel portion 46 integral with a sleeve portion 48. The sleeve portion 48 has a threaded bore receiving the rod 36, and it will be understood that one can manually grasp the wheel portion 46, for the purpose of adjusting the nut 48 longitudinally of the rod 36.

The nut, as will be apparent, can be threaded toward the hanger arm 26, and when the nut is adjusted in this manner, it will place the spring 44 under a selected amount of tension, and will limit swinging movement of the hanger arm 26 in a direction away from the wheel 13 of the vehicle.

In the lower ends of the members 27 (see Figure 3), we provide transversely aligned openings 50, said openings receiving the reduced ends 52 of a roller shaft 54. Set collars 56 are applied to the opposite ends of the roller shaft, to hold the roller shaft in assembled relation with the members 27.

The roller shaft is adapted to support an idler roller designated generally at 58, between the members 27 of the hanger arm. The roller 58, in this connection, includes at its opposite ends heads 60 of circular outer configuration, said heads being integrally formed, at their centers, with hub portions 62 receiving the reduced ends 52 of the roller shaft. In the hub portions 62 we provide sealing rings 64 to prevent leakage of lubricant.

The heads 60 are secured by circumferentially spaced screws 66 to a body portion 68, said body portion 68 tapering from its mid-length portion toward its opposite ends.

The body portion 68 has an axial bore 70 of substantially greater diameter than the diameter of the roller shaft 54, and interposed between the roller shaft and the body 68 is a bearing 74, a bearing 74 being provided at each end of the idler roller.

Trained about the idler roller is a traction chain 76, said chain being of the endless type and including longitudinal chain elements 78, connected by cross chain elements 80. It will be understood that in referring to the chain 76 as a chain of the endless type, it is intended to specify that the chain is endless when mounted upon the wheel 13, ready for use. Ordinarily, however, when mounting the chain upon the wheel, selected links of the longitudinal chain element 78 can be separated.

Certain of the cross chain elements 80 are detachably connected, at one end, to one of the longitudinal chain elements 78. To this end, we provide connecting links 82 (see Figure 5), which links are so formed as to be detachably connected to their associated longitudinal chain element.

Figure 6:
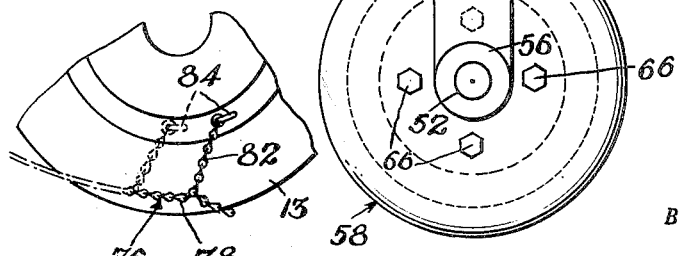
Figure 6 is a fragmentary side elevational view of the truck wheel and of the chain trained thereabout, showing the means for mounting the chain upon the wheel.

When an auxiliary traction device formed in accordance with the present invention is to be used, hook elements 84 are fixedly secured, as by welding, to opposite sides of the wheel 13, said hook elements being connected, for example, to the marginal portion of the wheel rim. In mounting the chain upon the wheel, it is not necessary to jack up the wheel. Instead, the chain 76 is first passed about the idler roller, after which the detachable cross chain elements, of which there are preferably two, are engaged with the hook elements 84 in the manner shown in Figure 6.

Figure 1:
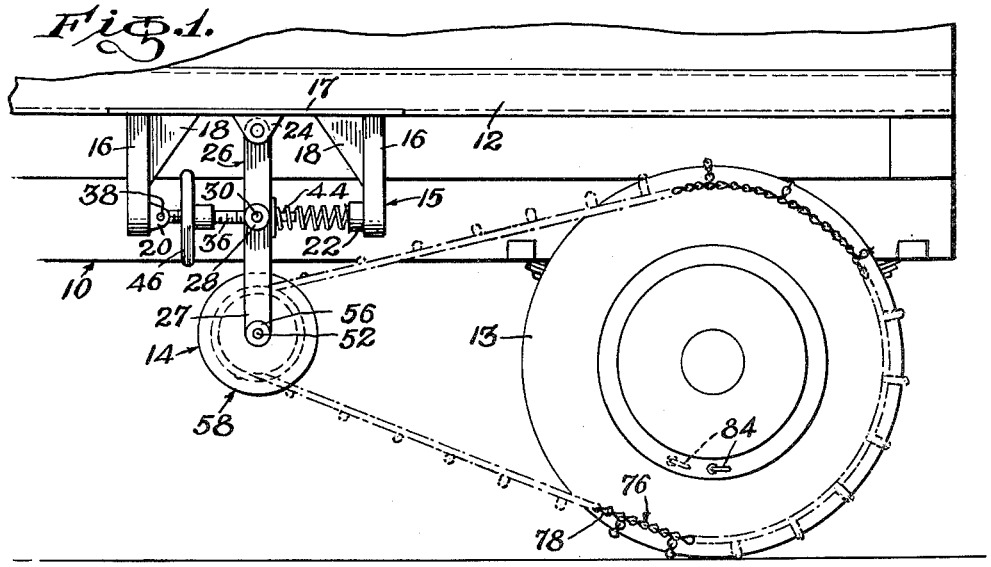
Figure 1 is a side elevational view of an auxiliary traction device formed in accordance with the present invention, as it appears when in use, a truck on which the device is mounted being illustrated fragmentarily and in side elevation.

Use of the cross chain elements 82 to aid in the mounting of the chain upon the wheel 13 permits a desirable amount of slack to be provided in the longitudinal chain elements, during the mounting of the device upon the wheel. In mounting the device on the wheel, the wheel is permitted to spin through part of a single cycle of rotation, as a result of which the hook elements 84 will pull the longitudinal chain elements 78 under the wheel, causing the longitudinal chain elements to be trained about the wheel in the manner shown in Figure 1. The selected cross chain elements 82 are then detached from hook elements 84, and are reattached to their associated longitudinal chain elements, after which the device is ready for use.

In use of the device, the chain will be held under tension by the spring 44, which will urge the hanger arm 26 in a direction away from the wheel 13. It will thus become apparent that on rotation of the drive wheel 13, considerable traction will be obtained, thus to permit the vehicle to be pulled out of mud or snow in which it may have been mired.

Further, the device is particularly valuable as an auxiliary traction attachment for a military vehicle, it being well appreciated that military vehicles are often driven through muddy and rough terrain.

When the device is not in use, the chain is removed, and need merely be coiled about its associated idler roller, thus to permit the chain to be stored in a minimum area, without possibility of its becoming accidentally entangled.

It is also considered to be an important characteristic of the invention that during use of the device, the particular formation of the roller is such as to cause the longitudinal chain elements to be held in engagement with the inner surfaces of the heads 60 of the idler roller.

Also, it is thought desirable to note that the roller is provided with a rubber covering 72, which reduces noise of operation, said rubber covering being readily removable when it becomes worn.

To mount the auxiliary traction device upon the vehicle chassis, it is merely necessary that the hanger bracket be bolted to the longitudinal frame member 12, at a location where it will not interfere with normal operation of the vehicle.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. An auxiliary traction device for vehicles comprising: a hanger bracket of inverted U shape having vertically depending legs and a horizontal bight and adapted to be fixedly connected at the bight thereof to a structural part of a vehicle adjacent a wheel of the vehicle; a pendent hanger arm connected at its upper end to said bight between the legs of the bracket for swinging movement in a vertical plane; an idler roller rotatably mounted on the lower end of said hanger arm for movement toward and away from a wheel of the vehicle responsive to swinging movement of the arm on the bracket; resilient, yielding means held under compression between one leg of the bracket and an intermediate portion of said arm to normally urge the arm and roller away from the wheel; a threaded guide rod pivotally connected at one end to the other leg of the bracket, said hanger arm having an opening loosely receiving the other end of the rod; a nut threadable on the rod toward and away from the hanger arm to limit said movement of the hanger arm away from said wheel; and an endless traction chain trained about said roller and wheel and held under tension by movement of the arm and roller away from the wheel under the pressure of said means.

2. An auxiliary traction device for vehicles comprising: a hanger bracket of inverted U shape having vertically depending legs and a horizontal bight and adapted to be fixedly connected at the bight thereof to a structural part of a vehicle adjacent a wheel of the vehicle; a pendent hanger arm connected at its upper end to said bight between the legs of the bracket for swinging movement in a vertical plane; an idler roller rotatably mounted on the lower end of said hanger arm for movement toward and away from a wheel of the vehicle responsive to swinging movement of the arm on the bracket; resilient, yielding means held under compression between one leg of the bracket and an intermediate portion of said arm to normally urge the arm and roller away from the wheel; a threaded guide rod pivotally connected at one end to the other leg of the bracket, said hanger arm having an opening loosely receiving the other end of the rod; a nut threadable on the rod toward and away from the hanger arm to limit said movement of the hanger arm away from said wheel; an endless traction chain trained about said roller and wheel and held under tension by movement of the arm and roller away from the wheel under the pressure of said means; and hook elements mountable upon said wheel at locations spaced from the center thereof, said chain including longitudinal chain elements passed about said roller and wheel and cross chain elements, selected cross chain elements being detachably connected at one end to the respective longitudinal chain elements for engagement with the hook elements of the wheel, to facilitate mounting of the chain upon the wheel in the roller engaged position of the chain.

3. An auxiliary traction device for vehicles comprising: a hanger bracket of inverted U-shape having vertically depending legs and a horizontal bight and adapted to be fixedly connected at the bight thereof to a structural part of the vehicle adjacent a wheel of the vehicle; an H-shaped pendent hanger arm having a pair of spaced parallel arm members and a cross member carried between said arm members intermediate their ends and extending normally thereto, said cross member having a transverse opening therein, said hanger arm pivotally connected at the upper ends of the arm members to the bight of said hanger bracket for swinging movement in a vertical plane; an idler roller rotatably mounted on the lower end of said hanger arm for movement toward and away from a wheel of the vehicle responsive to swinging movement of the arm on the bracket; resilient, yielding means held under compression between one leg of the hanger bracket and an intermediate portion of said cross member of said hanger arm to normally urge the arm and roller away from the wheel; a threaded guide rod pivotally connected at one end to the other leg of the bracket and received in the transverse opening in said cross member; a nut threadable on the rod toward and away from the cross member to limit said movement of the hanger arm away from said wheel; and an endless traction chain trained about said roller and wheel and held under tension by movement of the arm and roller away from the wheel under pressure of said means.

FRANK BOUMA.
ADRIAN van der VLIET.

References Cited in the file of this patent
UNITED STATES PATENTS

| Number | Name | Date |
|---|---|---|
| 1,256,744 | Tolsma | Feb. 19, 1918 |
| 1,280,044 | Knisley | Sept. 24, 1918 |
| 1,453,782 | Bell | May 1, 1923 |